UNITED STATES PATENT OFFICE.

LOUIS E. BARTON, OF NIAGARA FALLS, NEW YORK, ASSIGNOR TO THE TITANIUM ALLOY MANUFACTURING COMPANY, OF NEW YORK, N. Y., A CORPORATION OF MAINE.

TITANIUM-OXID PAINT AND PIGMENT AND PROCESS OF MAKING SAME.

1,251,170. Specification of Letters Patent. Patented Dec. 25, 1917.

No Drawing. Application filed March 25, 1916. Serial No. 86,624.

*To all whom it may concern:*

Be it known that I, LOUIS E. BARTON, a citizen of the United States, and a resident of Niagara Falls, in the county of Niagara and State of New York, have invented certain new and useful Improvements in Titanium-Oxid Paints and Pigments and Processes of Making Same, of which the following is a specification.

My present invention relates to those paints the pigments of which are composed, to a greater or less extent, of titanic oxid, and especially of such oxid in the form and association known as a "composite titanic oxid pigment" of the type, for example, described in Letters Patent No. 1,155,462, granted to me October 5, 1915.

The objects of my invention comprise provision of means whereby such paints can be improved in certain particulars, as, for example, workability and durability, and their use rendered more economical.

The enormous extent of natural titanic oxid deposits has resulted in its being long, but unsuccessfully, sought to make use of that compound as a pigment in paints, as, for example, either in the form of natural rutile, or combined with iron oxids, in colored pigments.

The difficulty and expense of, on industrial scales, separating such titanic oxid in required purity and quantity from the undesired substances therewith intermingled in nature, such as iron compounds and gangue, have, however, long prohibited its use for such purposes.

Notwithstanding the comparatively recent advent of cheaper and better methods of concentration, the titanic products of the earlier of these have failed as pigments in paints, for various reasons, including their crystalline and gritty character, and comparative inability to impart the unsurpassed hiding power since developed by aid of differently derived and treated titanic oxid.

It is only very recently that methods have been devised and practised resulting in higher concentrations, the titanic oxids ($TiO_2$) of which are in amorphous state, chemically uncombined with other substances, and correspondingly comparatively free from many of the faults referred to. Such methods and their resulting products are disclosed in Letters Patent Nos. 1,106,406, 1,106,407, 1,106,408, 1,104,409 and 1,106,410, all granted to Auguste J. Rossi and myself on August 14, 1914.

While such last mentioned forms of titanic oxid have proved a great advance, they have, in several particulars, including hiding power particularly, been surpassed by still more recent products of the type described in said Letters Patent No. 1,155,462, and designated "Composite titanic oxid pigments." Reference to said patent will more fully disclose the methods whereby these are produced and their characteristics, which, may, for the purposes of this specification, be summarized as comprising the precipitation of extremely minute particles of titanic oxid ($TiO_2$), upon, and their coalescence with, particles of a suspended sulfate base, or extender, the resulting novel product (which is believed to be an adsorption compound) being distinguished, and claimed in said patent, as a composite pigment comprising titanic oxid and a sulfate extender, or more specifically as such pigment comprising particles of a sulfate extender and thereto adhering smaller particles of titanic oxid.

My present invention is based upon my discovery that the durability, and the workability under the brush, of paints containing said titanic oxid, or more especially said composite titanic oxid, pigments can be improved, without impairing the peculiar and great hiding powers thereby imparted, if there be added thereto even very considerable, but properly selected, proportioned, and applied, admixtures therewith of a variety of other naturally occurring mineral, as distinguished from artificially metal-derived, substances, the which I believe to be properly designatable generically as "mineral extenders."

Such substances are not of truly metallic character or of artificial origin. They are less costly than even titanic oxid pigments, and consequently much less so than any other metal-derived pigments such as white lead or zinc oxid.

I have, according to differing requirements of particular cases, found either one, or more, of the following of such mineral extenders peculiarly suitable for the purpose specified, viz: barytes, silica, gypsum, asbestine, whiting, and china clay.

Though these substances are in themselves practically devoid of hiding power, they do not, in quantity sufficient for my purpose, appear to materially reduce the to-be-expected hiding power of the titanic oxid pigment with which they are mixed.

The combination, for the purpose, of these mineral extenders with properly derived titanic oxid, or more particularly with the composite titanic oxid pigments referred to, may be effected in any convenient manner, but I have found it preferable to preliminarily, as thoroughly and homogeneously as possible, intermix them as by grinding them together in dry state, after which they are still more intimately mixed by the usual grinding together with oil, to bring the product into the paste form in which paint is usually marketed preparatory to its being further manipulated into condition suitable for immediate use, as by the customary further incorporation of such vehicles as oil, driers, thinners, or varnish, etc. Or the required mixture may be effected by intermixing, or grinding, together preliminarily separately prepared pastes containing respectively the one the titanic oxid pigment, and the other the extenders, or even by introducing them during the final reduction of the paint with said oil, driers, thinners, etc.

For certain special uses it will be found advantageous instead of, as above, directed, grinding the substances together, to add, finely pulverized, such of said mineral extenders as are insoluble therein to the bath in which is occurring the above referred to precipitation of minute particles of titanic oxid, in which case the latter will be found to coalesce with and adhere to therein suspended minute particles of such extenders. In my pending applications for Letters Patent Serial No. 40,639, filed July 19, 1915, and No. 102,393, filed June 8, 1916, I have disclosed, and claimed, this last above described method of combining such added mineral extenders with titanic oxid.

As regards the proportions in which the mineral extenders should be added to the titanic oxid pigments, these will vary according to the particular extender employed, and to the special requirements of each case, depending upon the purposes for which the paints are to be used, etc., as will be apparent to those skilled in the art; but I have not yet found that in any case can the best results, as regards hiding power of the paint, be expected from any such additions if substantially in excess of say 20% calculated on the total of the combination of titanic oxid pigment, or of composite titanic oxid pigment, with the extender, though, without departing from my invention, larger additions may, of course, be employed for economy, etc., but with corresponding impairment of hiding power.

In selecting and adding these mineral extenders, it is also desirable to bear in mind that each possesses distinctive properties. For example, the relatively high specific gravity of barytes renders it more suitable for paint to be applied by brushing, while for paint designed for the dipping process and reduced in the vats by liberal addition of thinners one of the extenders of lower specific gravity such as china clay should be selected.

For general use, I find barytes particularly well adapted for the purposes specified.

Having now described my invention, what I claim as new and desire to secure by Letters Patent is the following, viz:

1. A pigment comprising a mineral extender and amorphous titanic oxid ($TiO_2$) chemically uncombined with other substances.

2. A pigment comprising titanic oxid together with a sulfate base, intermixed with a mineral extender.

3. A pigment comprising particles of a sulfate base having thereto adhering smaller particles of titanic oxid intermixed with a mineral extender.

4. A pigment comprising titanic oxid and thereto unadherent barytes.

5. A pigment comprising titanic oxid coalesced with a sulfate base, and intermixed with therewith uncoalesced barytes.

6. A pigment comprising particles of a sulfate base having thereto adhering smaller particles of titanic oxid and also comprising barytes unadherent to said particles.

7. A pigment comprising principally titanic oxid and not to exceed 20% of a therewith intermixed mineral base.

8. A pigment comprising principally a composition of sulfate base with titanic oxid and also not to exceed 20% of a therewith intermixed mineral extender.

9. Paint containing a composition of sulfate base with titanic oxid, and also a therewith intermixed mineral extender.

10. The method of making paint which comprises grinding together titanic oxid and a mineral extender, and grinding the resulting product together with a paint vehicle.

11. The method of making paint which comprises intimately intermixing a mineral extender together with a composition of titanic oxid with a sulfate base, and mixing the resulting product together with a paint vehicle.

LOUIS E. BARTON.

Witnesses:
Tom C. Graham,
B. C. Potter.